(12) United States Patent
Cutaia

(10) Patent No.: US 8,094,667 B2
(45) Date of Patent: Jan. 10, 2012

(54) RTP VIDEO TUNNELING THROUGH H.221

(75) Inventor: Nicholas J. Cutaia, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 594 days.

(21) Appl. No.: 12/176,125

(22) Filed: Jul. 18, 2008

(65) Prior Publication Data

US 2010/0014530 A1    Jan. 21, 2010

(51) Int. Cl.
*H04L 12/06* (2006.01)
(52) U.S. Cl. ......... 370/401; 370/437; 370/465; 370/474
(58) Field of Classification Search .................... 370/401
See application file for complete search history.

(56) References Cited

U.S. PATENT DOCUMENTS

| | | | |
|---|---|---|---|
| 5,402,418 A | 3/1995 | Shibata et al. | |
| 5,604,738 A | 2/1997 | Shibata et al. | |
| 5,764,279 A * | 6/1998 | Ford et al. | 348/14.08 |
| 6,026,080 A | 2/2000 | Roy | |
| 6,683,909 B1 * | 1/2004 | Falco | 375/240.24 |
| 6,996,624 B1 * | 2/2006 | LeCroy et al. | 709/231 |
| 2002/0199203 A1 * | 12/2002 | Duffy et al. | 725/109 |
| 2004/0090989 A1 * | 5/2004 | Kobayashi | 370/469 |
| 2005/0105559 A1 * | 5/2005 | Cain et al. | 370/498 |
| 2006/0056627 A1 | 3/2006 | Linzer et al. | |
| 2008/0151941 A1 * | 6/2008 | Ghodrat et al. | 370/503 |
| 2008/0298378 A1 * | 12/2008 | Shiba | 370/401 |

* cited by examiner

*Primary Examiner* — Jason Mattis
*Assistant Examiner* — Maria Sekul
(74) *Attorney, Agent, or Firm* — Brinks Hofer Gilson & Lione

(57) ABSTRACT

A system is provided. The system includes a first gateway operable to receive a real-time protocol (RTP) packet including video data from a first endpoint; and a second gateway operable to communicate with a second endpoint. The first gateway is operable to communicate the RTP packet to the second gateway in a sub-channel portion of an frame-based protocol.

18 Claims, 7 Drawing Sheets

CAPABILITIES MESSAGE

| 0xFE | N = 6 | Country Code | Man. Code | MSG_ID = RTP_TUNNEL_MSG | RTP_TUNNEL |
|---|---|---|---|---|---|
| BYTE 0 | 1 | 2 | 3 | 4 | 5 | 6 |

COMMAND MESSAGE

| 0xFF | N = 7 | Country Code | Man. Code | MSG_ID = MTU_SIZE_MSG | MTU | MTU |
|---|---|---|---|---|---|---|
| BYTE 0 | 1 | 2 | 3 | 4 | 5 | 6 | 7 |

FIGURE 2A

RTP Packet

| 0 | 1 | 2-3 | 4-7 | 8-11 |
|---|---|---|---|---|
| VPXCC | pt | sn | ts | ssrc |
| Sub-Header | | | | |
| Video Payload | | | | |

RTP Header

FIGURE 2B

RTP VIDEO TUNNELING THROUGH H.221

BACKGROUND

The present embodiments relate to tunneling a real-time protocol (RTP) packet. During a typical video conference, an H.221 frame may be used to transmit portions of an RTP packet between an originating gateway and a terminating gateway. Before transmitting the RTP packet, the originating gateway removes the RTP header and RFC-specific sub-header. When performing the RTP de-packetization, the information in the RTP sub-headers and fragmentation boundaries, specified in the IETF RFC for each of the video codecs, are lost. Once the RTP packet is de-packetized, only the video bits from the RTP packet are copied into the sub-channels of the H.221 frame. Upon arrival at the terminating gateway, the fragmentation boundaries and RTP sub-headers are re-determined. The process of re-determining the RTP fragmentation boundaries and RTP sub-headers is a computationally intensive task. In addition, calculation of the boundaries and RTP sub-headers is based on defined specifications. As these specifications are modified, the conferencing system must be updated to accommodate the modified specifications.

BRIEF DESCRIPTION OF THE DRAWINGS

FIG. 2A illustrates one embodiment of a capabilities message and a command message.

FIG. 2B illustrates one embodiment of an RTP packet.

DETAILED DESCRIPTION

Figure 1:
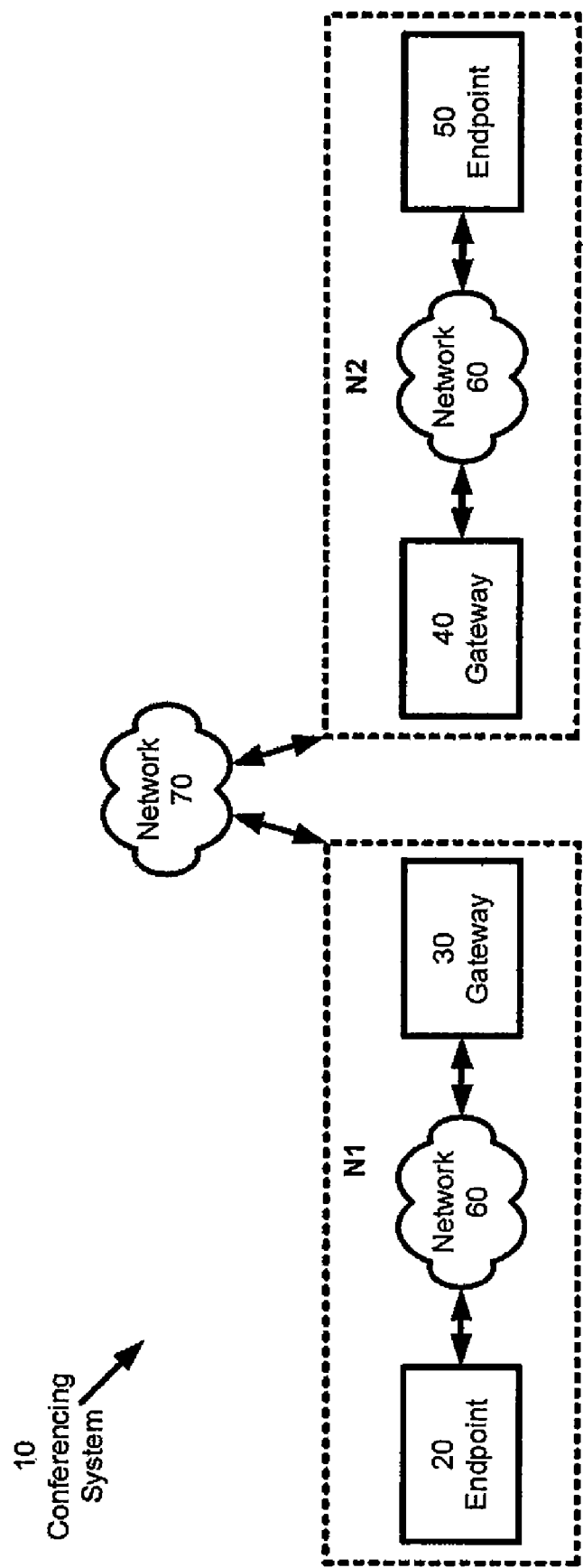
FIG. 1 illustrates one embodiment of a conferencing system.

The present embodiments relate to copying an RTP packet in the sub-channel portion of an H.221 frame. During a video conference, an RTP packet may be transmitted from a first endpoint to a second endpoint. The RTP packet is transmitted from the first endpoint to a first gateway. Without removing header and sub-header information from the RTP packet, the first gateway copies the RTP packet in the sub-channel portion of an H.221 frame. The entire RTP packet, which includes the RTP header, RFC-specific sub-header, and video payload data, is copied into the sub-channel portion of the H.221 frame. Since the entire RTP packet is transmitted intact, the fragmentation boundaries in the video bitstream do not have to be re-calculated at the receiving gateway, thus saving processing cycles and memory.

In a first aspect, a conferencing system includes a first and second gateway. The first gateway is operable to communicate with a first endpoint. A second gateway is operable to communicate with a second endpoint. The first gateway is operable to communicate with the second gateway using a protocol. The first gateway is operable to package a video packet into a payload portion of a high speed protocol packet.

In a second aspect, a gateway for video data transmission includes a memory comprising a packing program that packs a video packet into a video portion of an H.221 frame; and a processor coupled to the memory that executes a setup program and transmit program.

In a third aspect, a method for video data transmission is provided. The method includes receiving a video packet including header, sub-header, and video data; copying the header, sub-header and video data of the video packet into a sub-channel portion of an H.221 frame; and transmitting the H.221 frame to a first communication device using a defined protocol.

As one example of video conferencing, employee X, who is based in California, uses a videoconferencing system to display video data. In order to transmit the data to employee Y, who is based in Europe, the video data is packetized and transmitted to a first gateway. The first gateway places the video packet, including the header, video sub-header, and video payload data into the payload section of an H.221 specified frame. The H.221 specified frame is transmitted to a second gateway. The video packet is identified and extracted from the payload section of the H.221 frame. The second gateway transmits the video packet to Employee Y's video conferencing system, where the video packet is used to display video of Employee X.

As additional or modified specifications are recommended for aggregating, fragmenting, or interleaving, RTP packets may be transmitted from gateway-to-gateway without adapting modified specifications or modifying the gateway to conform to the new specifications because packets received at the originating gateway do not have the RTP header and video sub-header removed before transmission; and thus they do not need to be re-computed at the terminating gateway when parsing the video data stream.

The International Telecommunications Union (ITU) adopts ITU-T Recommendation H.320 ("H.320") and ITU-T Recommendation H.323 ("H.323") as the international standards for videoconferencing. H.320 standard allows videoconferencing over Integrated Service Digital Network (ISDN) and other circuit switched networks and services (e.g., Public Switched Telephone Network). In H.320, video bits are transmitted as frames compliant with ITU-T Recommendation H.221 ("H.221"). H.323 standard extends the H.320 standard series to handle data flow across the Internet and Local Area Networks (LANs). In H.323, video bits are transmitted as Real-Time Transport Protocol (RTP) packets. RTP provides end-to-end network transport functions suitable for applications transmitting real-time data over multicast or unicast network services (RTP is defined by the Internet Engineering Task Force (IETF), and is described in RFC3550). Other packet-based video conferencing protocols that also use the RTP for media transport include Session Initiation Protocol (SIP), Media Gateway Control Protocol (MGCP), and Skinny Client Control Protocol (SCCP) among others.

The specification and drawings illustrate using an H.221 frame as the framing structure for carrying data over the ISDN-based network. However, any framing structure that is operable to carry an RTP packet may be used. For example, as used herein "the H.221 frame" may be any framing protocol used to carry video data, or any now known or later developed framing protocol used to carry data.

FIG. 1 shows one embodiment of a conferencing system 10. The conferencing system 10 may include a first network N1 and a second network N2. The network N1 may include a first endpoint 20 and a first gateway 30. The second network N2 may include a second gateway 40 and a second endpoint 50. Additional, different, or fewer components or devices may be provided. For example, the first endpoint 20 and/or second endpoint 50 may be remote located. In another example, the gateways 30, 40 and endpoints 20, 50 are not components of the networks N1, N2. The gateways and endpoints may be components of the same, different, fewer, or additional networks.

The network N1 may communicate with network N2 using the network 70. The network 70 may be a public switched telephone network (PSTN), Integrated Services Digital Network (ISDN), or any now known or later developed communication network. The PSTN and ISDN are circuit-switched telephone network systems, designed to allow digital transmission of voice and data over telephone networks.

The conferencing system 10 is a packet-based system, videoconferencing system, teleconferencing system, audio conferencing system, Web conferencing system, packet switching network, any combination thereof, or any other now known or later developed communication system. The conferencing system 10 may be used for real-time protocol (RTP) video tunneling. For example, the conferencing system 10 may automatically transmit an RTP packet in the sub-channel portion of an H.221 frame. The sub-channel portion of the H.221 frame may include the header, video sub-header, and video payload data. In another example, the conferencing system 10 is a system for setting up RTP tunneling between two gateways. Automatic set up may include automatically transmitting configuration and command messages. In another example, the conferencing system 10 is a system for multi-user video conferencing.

The conferencing system 10 transmits conference data between the endpoint 20 and endpoint 50. Conference data may include voice data, video data, text data, multimedia data, any combination thereof, or any conference data. The conference data may be analog or digital data.

The network 60 may be used for communication between the endpoint 20 and the gateway 30. The network 60 may be an internal and/or external network. For example, the network 60 may be an Internet Protocol (IP) network and/or Intranet network.

The endpoints 20, 50 may include processors, memory, displays, and/or video input devices, such as Web cameras, digital video cameras, or video input devices. Additional, different or fewer components may be provided. For example, the endpoints 20, 50 may include audio input and/or output devices, such as speakers or microphones. In another example, the endpoints 20, 50 may not include a video input device. Video data may be stored locally, such as in memory.

The endpoints 20, 50 are personal computers, workstations, networks, conferencing stations, desktop videoconferencing systems, Web conferencing devices, servers, modems, remote terminals, any combination thereof, or other now know or later developed communication device for transmitting and/or receiving video or other conferencing data. The endpoints 20, 50 are used for recording, generating, transmitting, and/or displaying conference data. In the example above, endpoint 20 is employee X's personal computer with a digital video camera and microphone.

The endpoint 20 may record, receive, or request conference data. For example, the endpoint 20 may be used for video capture. Video capture includes converting an analog video signal into a digital format that can be saved onto a hard disc or optical storage device and manipulated with image software. In another example, conference data is retrieved from memory. In yet another example, conference data is requested from a remote processing system. In another example, a digital camera is used to capture digital conference data. In one embodiment, the endpoint 20 may receive the RTP packet from a remote communication device and relay the RTP packet to the gateway 30.

The endpoint 20 may create the RTP packet. If the endpoint 20 captures the video data stream, the endpoint 20 may parse the video stream to determine the boundaries for the RTP packet. The endpoint 20 may calculate and create the video sub-header that resides in the RTP packet.

In one embodiment, the system 10 transmits and receives conference traffic according to a defined protocol. Real-Time Transport Protocol (RTP) defines a standard packet format for delivering audio and video over the Internet. For example, the system 10 may employ RTP over the Internet Protocol (IP) to provide a responsive conference experience for the endpoints 20, 50. In addition, the signaling in the system 10 may proceed according to the H.323 packet-based multimedia communications system standard published by the ITU. In other embodiments, however, the system 10 may employ additional or alternative protocols selected according to any desired network implementation specifications. Now known or later developed protocols may be used.

RTP supports video conferences with multiple, geographically dispersed participants. RTP may be used in Internet telephony applications. Although termed "real-time," RTP does not guarantee real-time delivery of multimedia data (e.g., since it is dependent on network characteristics, such as buffering, network delay, and segmentation).

The endpoint 20 may packetize conference data. The packets may be sent to the endpoint 50, gateways 30, 40, or any other communication device. The endpoint 20 may generate a packet including the conference data before it is forwarded through the network N1. The packet may be generated according to a defined protocol. For example, the packet may be an RTP packet, which is transmitted according to an RTP protocol. However, other packets may be defined and transmitted.

As shown in FIG. 2B, the RTP packet may include an RTP header, a sub-header, and video payload data. The header may include version information (V), padding information (P), extension information (X), contributing source ID (CSRC) information (CC), payload type information (pt), sequence number (sn) information, timestamp (ts) information, and synchronization source (SSRC) ID information. The sub-header may be an RFC specific video sub-header.

The gateways 30, 40 may include processors and memory. Additional, different, or fewer components may be provided. For example, the gateways 30, 40 may include input devices. In another example, the gateways 30, 40 may additionally include a protocol translator, impedance match, rate converter, fault isolator, signal translator, or other device or instruction to provide system interoperability. The gateways 30, 40 may be implemented in hardware, software or both. For example, the gateway 30 may be implemented by software installed within a router.

The gateways 30, 40 are computers, routers, servers, processing systems, networks, network points, endpoints, remote terminals, originating gateways, terminating gateways, any combination thereof, or any now known or later developed device for converting protocols among communication networks or devices. The gateways 30, 40 may accept an RTP packet formatted for one protocol (e.g. H.320) and convert the packet to a packet formatted for another protocol (e.g. H.323) before forwarding the packet. The gateway 30 understands the protocols used by each network linked into the router. The gateways 30, 40 are network points that are entrances to other networks. For example, gateway 30 is an entrance into network N2 for endpoint 20.

The gateway processors are general processors, digital signal processors, application specific integrated circuits, field programmable gate arrays, analog circuits, digital circuits, combinations thereof, or other now known or later developed processors. The processor may be a single device or a combination of devices, such as associated with a network or distributed processing. Any of various processing strategies may be used, such as multi-processing, multi-tasking, parallel processing, remote processing, or the like. The processor is responsive to instructions stored as part of software, hardware, integrated circuits, firmware, micro-code or the like.

Figure 3:
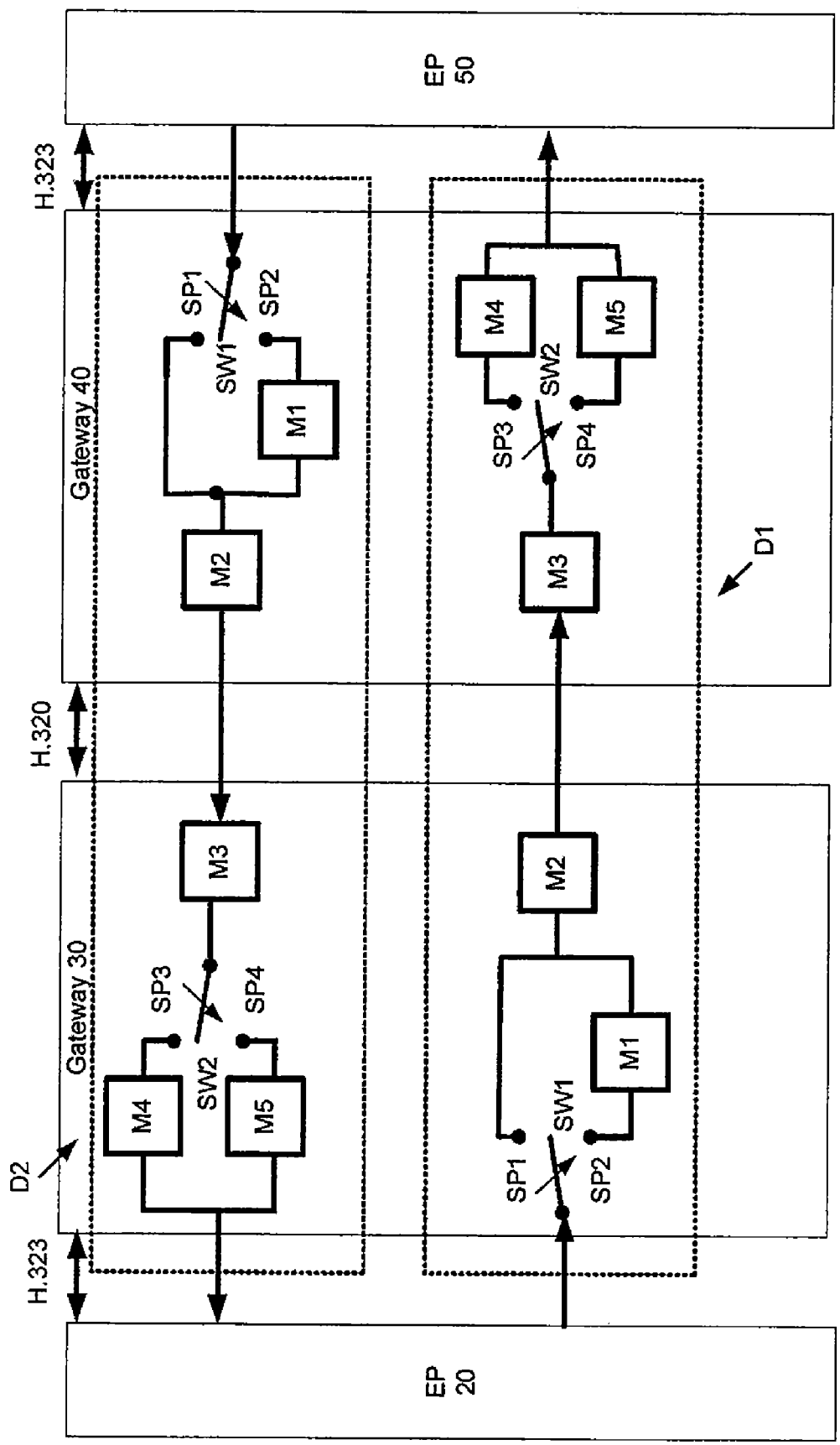
FIG. 3 illustrates another embodiment of a conferencing system.

As shown in FIG. 3, the gateways 30, 40 may include an RTP de-packetization module M1; an H.221 framer module M2; an H.221 de-framer module M3; a header correlation module M4; and RTP packetization module M5. Additional, different, or fewer modules or components may be provided. For example, the gateways 30, 40 may include switches SW1, SW2 for switching between the modules. The modules and switches may be logic stored in memory and executed by the processor. For example, the various modules and switches may be all, none, or some of a program that performs a distinct function.

The modules M1-M5 may be used to perform various functions. For example, the de-packetization module M1 removes the header and sub-header information from an RTP packet for transmitting through H.221. However, the RTP packetization module M5 re-packetizes the RTP packet.

Figure 4:
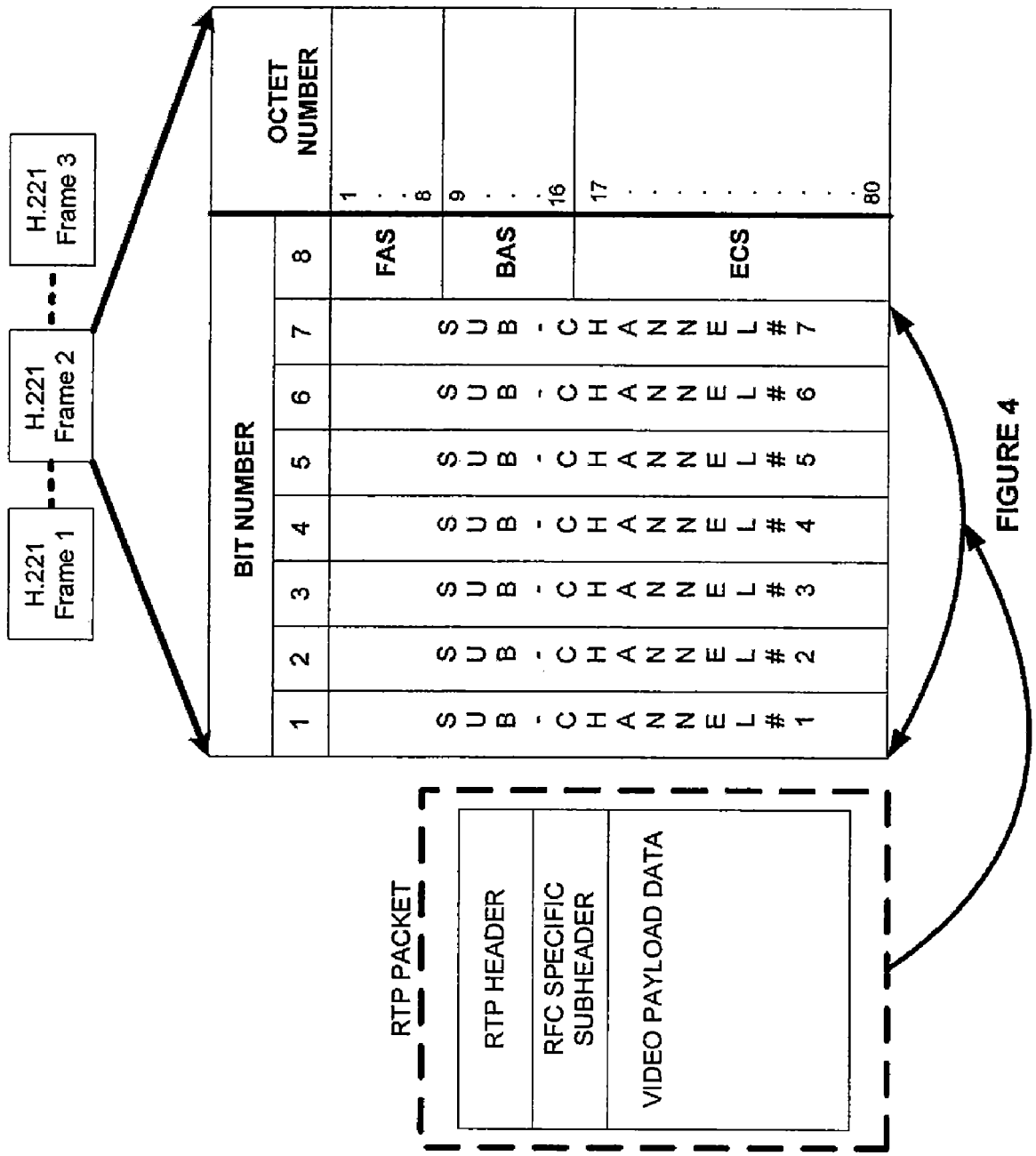
FIG. 4 illustrates one embodiment of copying an RTP packet into the sub-channel portion of an H.221 frame.

The H.221 framer module M2 is operable to copy the RTP packet into an H.221 frame. As shown in FIG. 4, the H.221 framer module M2 (of FIG. 3) may copy the entire RTP packet into the sub-channel portion of an H.221 frame. The sub-channel portion of the H.221 frame may include the header, sub-header, and video payload data of the RTP packet. As shown in FIG. 3 and discussed below, when the switch SW1 is connected to the switch point SP1, the RTP packet is directed directly to the H.221 framer module, without being de-packetized by the de-packetization module M1. To copy the RTP packet into the sub-channel portion of the H.221 frame, the gateway may buffer all, some, or none of the RTP packet before copying the RTP packet into the sub-channel portion. The deframer module M3 is operable to deframe the H.221 frames transmitted to the gateway 30, 40. Deframing the H.221 frames may include copying the sub-channel data into memory.

The header correlation module M4 is operable to perform header correlation. Header correlation is the process of determining where the RTP packets begin and end. The RTP packets may be larger or smaller than the size of the H.221 frame. For example, a single RTP packet may be copied into 2.5 H.221 frames. In another example, two or more RTP packets may be copied into a single H.221 frame. The header correlation process identifies where the beginning and end of the RTP packets are located, so that the RTP packet may be forwarded to the endpoint 50. One method of header correlation is discussed below and illustrated in FIG. 7.

FIG. 3 illustrates two different directions D1, D2 of transmission. An RTP packet may be transmitted from endpoint 20 to endpoint 50 in direction D1, and from endpoint 50 to endpoint 20 in direction D2. The functions or acts described herein for one direction apply to the respective portion of the other direction.

The gateway 30 may be configured for video tunneling through H.221. Configuring the gateway 30 may include setting up an H.221 tunnel. Setting up an H.221 tunnel may include determining whether the gateway 40 is operable to transmit and/or receive an RTP packet through an RTP video tunnel and determining the supported directions of RTP tunneling.

Figure 6:
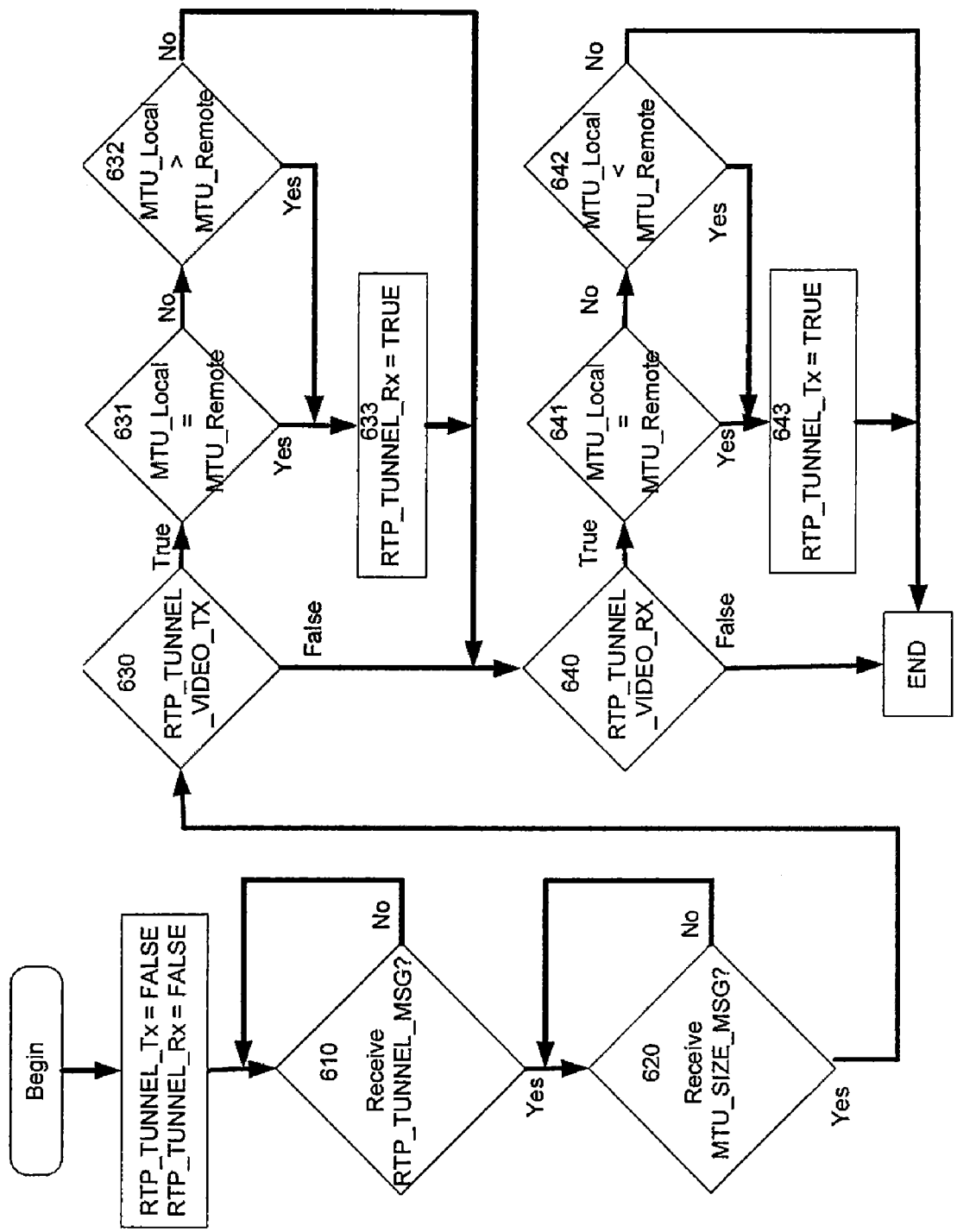
FIG. 6 illustrates one embodiment of a flow chart for setting up an RTP video tunnel through an H.221 frame.

FIG. 6 illustrates one embodiment of setting up an H.221 tunnel. The gateway 30 may receive an RTP_TUNNEL capabilities message and an MTU_SIZE command message from the gateway 40. The messages may be non-standard Bit-rate Allocation Signal (BAS) messages as specified in ITU-T Recommendation H.221. Accordingly, the messages may be exchanged between the gateways 30, 40 in the BAS field of an H.221 frame. The BAS field of the H.221 frame is illustrated in FIG. 4.

FIG. 2A illustrates one embodiment of a capabilities message and a command message. The capabilities message may indicate whether a gateway has the capability to transmit and/or receive one or more RTP packets in the sub-channel portion of an H.221 frame. The command message indicates the direction of RTP tunneling. The command message may include the maximum transmission unit (MTU) of the network N1, N2. The MTU size is the size of the largest datagram that can be sent over a network N1, N2.

The message identification (MSG_ID) field is used so that the gateway 30 knows which of the capabilities messages or command messages are being referred to when multiple messages are received. In other words, the MSG_ID indicates the message contents of the capabilities messages or command messages, since multiple capabilities messages and/or command message messages may be used by the gateway 30.

As shown in FIG. 6, at block 610, the gateway 30 processor may determine if a capabilities message was received from gateway 40. For example, as shown in FIG. 2A, if the first byte in the message is 0xFE, then a capabilities message (NS_cap) was received. The gateway 30 processor determines whether the MSG_ID=RTP_TUNNEL_MSG. If the MSG_ID=RTP_TUNNEL_MSG, then the message is an RTP_TUNNEL message. Similarly, at block 620 in FIG. 6, the gateway 30 processor may determine if a command message was received from gateway 40. For example, if the first byte in the message is 0xFF, then a command message (NS_comm) was received. The gateway 30 processor determines whether the MSG_ID=MTU_SIZE_MSG. If the MSG_ID=MTU_SIZE_MSG, then the message is an MTU_SIZE message.

The gateway 30 processor may use the capabilities and command messages to determine if the gateway 40 supports RTP tunneling and the direction of RTP tunneling supported by the networks N1, N2.

As shown at block 630 in FIG. 6, the gateway 30 may determine whether gateway 40 supports transmitting RTP packets through an H.221 tunnel. The message portion (RTP_TUNNEL) of the capabilities message (NS_cap) may be used to determine whether the gateway 40 supports transmitting RTP packets through an H.221 tunnel. For example, if the first bit in the message portion (RTP_TUNNEL) is set (e.g., a binary "1"), then the gateway 40 supports transmitting RTP packets through an H.221 tunnel. However, if the first bit in the message portion (RTP_TUNNEL) is not set (e.g., a binary "0"), then the gateway 40 does not support transmitting RTP packets through an H.221 tunnel.

The gateway 30 may determine tunneling directions based on the MTU size of networks N1, N2. As shown in FIG. 2A, the MTU size of network N2 may be transmitted in the command message. For example, the most significant byte of the MTU of N2 may be included in a first portion (e.g., byte 6 in FIG. 2A) of the MTU portion of the command message. Likewise, the least significant byte of the MTU of N2 may be included in a second portion (e.g., byte 7 in FIG. 2A) of the MTU portion of the command message. The gateway 30 processor may use the most significant and least bytes to determine the MTU size of the network N2.

As shown at blocks 631 and 632 of FIG. 6, the gateway 30 processor may compare the MTU of the local network (e.g., N1 in FIG. 1) and the remote network (e.g., N2 in FIG. 1). For example, in reference to FIG. 1, the gateway 30 processor may compare the MTU size of the network N2 to the MTU size of the network N1 to determine if MTU N1 is greater than or equal to MTU N2. If the MTU of the local network is equal to the MTU of remote network then tunneling may be performed in both directions, and if the MTU of local network is greater than the MTU of remote network, then tunneling may be done in one direction (e.g., from N2 to N1) but not in the other direction (e.g., from N1 to N2).

Accordingly, as shown at block 633 in FIG. 6, if the gateway 40 supports transmitting an RTP packet through an H.221 tunnel (block 630) and the MTU size of network N1 is equal to (block 631) or greater than (block 632) the MTU size of network N2, then the gateway 30 is configured to receive RTP packets in the sub-channel portion of an H.221 frame (e.g., RTP_TUNNEL_Rx is set to "True" at block 633). Configuring the gateway 30 to receive RTP packets in the sub-channel portion of an H.221 frame may include connecting switch SW2 to switch point SP3 for header correlation using the header correlation module M4. However, if either the gateway 40 does not support transmitting an RTP packet through an H.221 tunnel ("False" at block 630) and/or the MTU size of network N1 is less than the MTU size of network N2 ("No" at block 632), then the switch SW2 is connected to switch point SP4 for re-packetization of the RTP packet at the RTP packetization module M5.

At block 640 in FIG. 6, the gateway 30 may determine whether gateway 40 supports receiving RTP packets through an H.221 tunnel. The message portion (e.g., RTP_TUNNEL) of the capabilities message (NS_cap) may be used to determine whether the gateway 40 supports receiving RTP packets through an H.221 tunnel. For example, if the second bit in the message portion (RTP_TUNNEL) is set (e.g., a binary "1"), then the gateway 40 may support receiving RTP packets through an H.221 tunnel. However, if the second bit in the message portion (RTP_TUNNEL) is not set (e.g., a binary "0"), then the gateway 40 may not support receiving RTP packets through an H.221 tunnel.

The gateway 30 may determine tunneling directions based on the MTU size of networks N1, N2. The tunneling directions that were determined, for example, at blocks 631 and 632, above may be used. Alternatively, the gateway 30 may determine tunneling directions based on the MTU size of networks N1, N2. As shown in FIG. 2A, the MTU size of network N2 may be transmitted in the command message. As discussed above, the most significant byte of the MTU of N2 may be included in a first portion (e.g., byte 6 in FIG. 2A) of the MTU portion of the command message. Likewise, the least significant byte of the MTU of N2 may be included in a second portion (e.g., byte 7 in FIG. 2A) of the MTU portion of the command message. The gateway 30 processor may use the most significant and least bytes to determine the MTU size of the network N2.

As shown at blocks 641 and 642 of FIG. 6, the gateway 30 processor may compare the MTU of the local network (e.g., N1 in FIG. 1) and the remote network (e.g., N2 in FIG. 1). For example, in reference to FIG. 1, the gateway 30 processor may compare the MTU size of the network N2 to the MTU size of the network N1 to determine if MTU N1 is less than or equal to MTU N2. As discussed above, if the MTU of the local network is equal to the MTU of remote network then tunneling may be performed in both directions, and if the MTU of local network is less than the MTU of remote network, then tunneling may be done in one direction (e.g., from N1 to N2) but not in the other direction (e.g., from N2 to N1).

Accordingly, as shown at block 643 in FIG. 6, if the gateway 40 supports receiving an RTP packet through an H.221 tunnel (block 640) and the MTU size of network N1 is equal to (block 641) or less than (block 642) the MTU size of network N2, then the gateway 30 is configured to transmit RTP packets in the sub-channel portion of an H.221 frame (e.g., RTP_TUNNEL_Tx is set to "True" at block 643). Configuring the gateway 30 to transmit RTP packets in the sub-channel portion of an H.221 frame may include connecting switch SW1 to switch point SP1 for header correlation using the H.221 framer module M2. However, if either the gateway 40 does not support receiving an RTP packet through an H.221 tunnel ("False" at block 640) and/or the MTU size of network N1 is greater than the MTU size of network N2 ("No" at block 642), then the switch SW1 is connected to switch point SP2 for de-packetization of the RTP packet using the de-packetization module M1.

The first and second gateways are operable to confirm communication of the RTP packet to the second gateway in the sub-channel portion of the H.221 frame before or during a video conference. Using the capabilities and command messages to set up RTP tunneling, provides dynamic operation of the tunneling during a video conference. For example, if a user wants to transfer their video conference from one endpoint that is connected to the gateway while tunneling is operational, to some device that is connected directly to the ISDN network, tunneling cannot be supported after the transfer. Prior to the transfer of the video conference to the new device, the NS-cap messages can be sent from the receiving gateway to indicate that tunneling is not supported in either direction. The transmitting gateway will then configure the its switches to support these new constraints imposed by the video conference call transfer.

The gateways 30, 40 being used for a video conference may switch between tunneling and non-tunneling during the video conference. In other words, the tunneling setup can happen during a call, as well as at the beginning of a call. This allows additional gateways to join the video conference during the call.

The gateway 40 is configured as discussed above for the gateway 30. For example, the gateway 30 transmits a capabilities message and command message to the gateway 40. The gateway 40 uses the messages to setup for RTP tunneling.

As illustrated in FIG. 3, the gateway 30 processor may transmit the H.221 frame to gateway 40. The H.221 frame may include the RTP packet, which was copied into the sub-channel portion. The H.221 frame may be transmitted using the network 70. The network 70 may be a H.320 network. In addition, any transmission channel bandwidth may be used without changing the scope of the embodiments. For example, frame rates corresponding to 64 to 1920 kbits/sec may be used in any of the embodiments.

The gateway 40 may receive the H.221 frame. The gateway 40 processor may de-frame the H.221 frame, for example, using the deframer module M3. Deframing the received H.221 frame may include storing or copying the data in the H.221 frame in the gateway 40 memory. The data may be stored according to the H.221 frame. For example, as shown in FIG. 4, the data from Frame 1 may be stored, such that the data may be processed independently of the data from Frame 2. The data from Frame 1 may be processed before the data from Frame 2.

The gateway 40 processor may determine whether RTP tunneling through an H.221 frame is supported. Determining whether RTP tunneling through H.221 is supported may include analyzing a capabilities message and command message transmitted in the BAS portion of the H.221 frame. The messages may be non-standard BAS signals.

The gateway 40 processor may determine whether the gateway 30 supports RTP tunneling and the directions of RTP tunneling. Based on whether the gateway 30 supports RTP tunneling and the directions of RTP tunneling, the gateway 40 may either use an RTP packetization module M5 or header correlation module M4. For example, as shown in FIG. 3, if the gateway 30 does not support transmitting the RTP packet through an H.221 tunnel and/or the gateway 40 MTU size is less than the gateway 30 MTU size, the gateway 40 may packetize the RTP packet according to a defined protocol, such as the H.323 protocol that defines the network 60, for example, using the RTP packetization module M5 (e.g., SW2 connects to SP4). Alternatively, if the gateway 30 supports transmitting the RTP packet through an H.221 tunnel and the gateway 40 MTU size is greater than or equal to the gateway 30 MTU size, the gateway 40 may perform header correlation to the data in the H.221 frames using the header correlation module M4 (e.g., SW2 connects to SP3).

Figure 7:
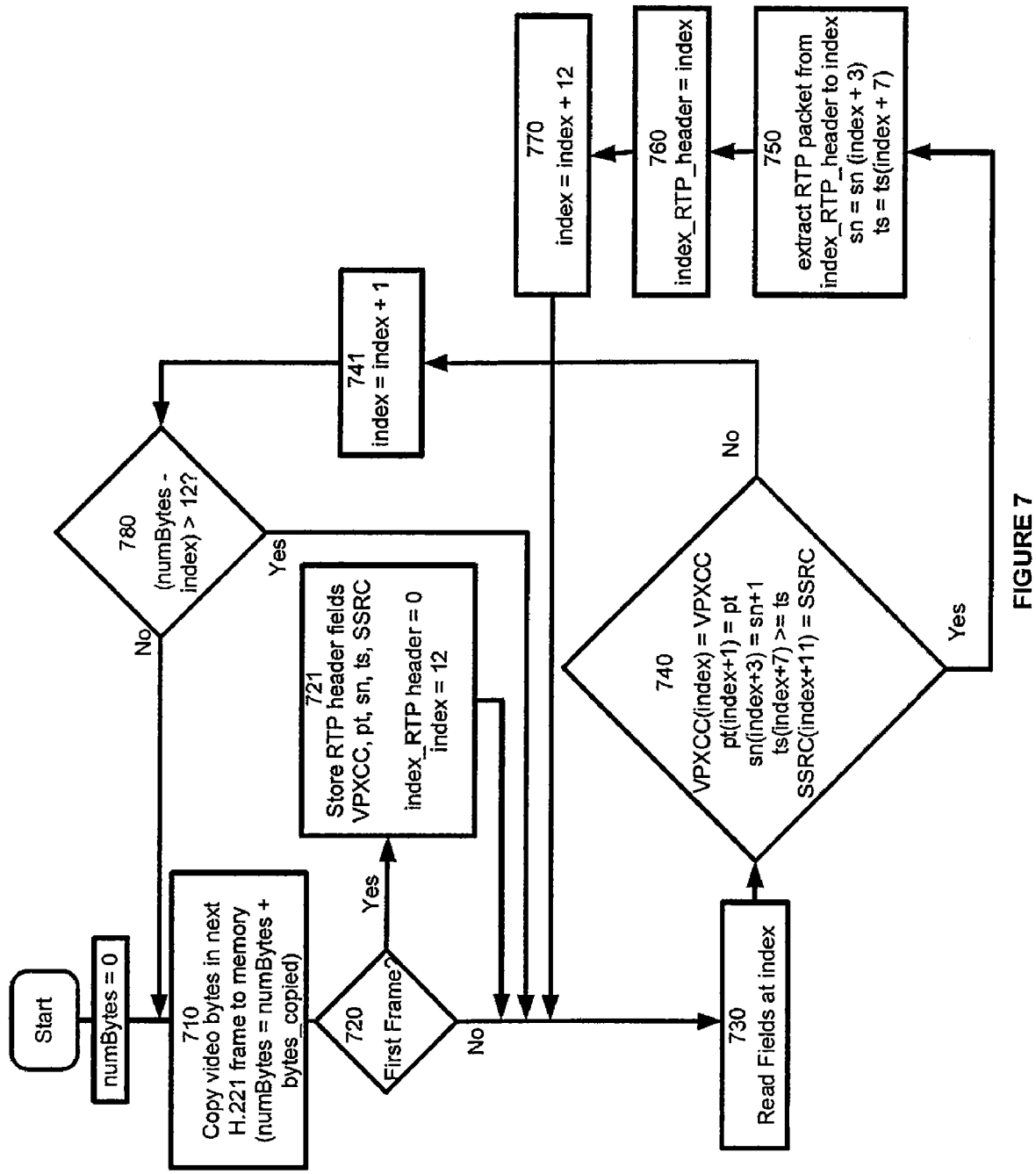
FIG. 7 illustrates one embodiment of a flow chart for a header correlation search process.

As discussed previously, header correlation is used to determine the beginning and ends of the RTP packets transmitted in one or more H.221 frames. FIG. 7 illustrates one embodiment of performing header correlation. During the header correlation process, the gateway 40 processor may copy the video bytes located in the sub-channel portion of the H.221 frame to gateway 40 memory. For example, at block 710 of FIG. 7, the gateway 40 processor may copy the video bytes from Frame 1 (e.g., of FIG. 4) to the memory. Accordingly, the gateway 40 processor may copy the video bytes from Frames 2 and 3 into memory when requested.

At block 720 of FIG. 7, the gateway 40 processor may determine if the data copied from the frame is the first frame received. The gateway 40 processor determines if it is the first frame by determining if this is the first time that an H.221 frame has been copied into memory. In the first H.221 frame, which is received, the RTP header is aligned to the beginning of the H.221 frame. The first 12 bytes of the H.221 frame corresponds to the initial RTP header that is used for the correlation search shown at block 740. As shown at block 721, the gateway 40 processor may read RTP frame header fields for the first packet and store the individual fields; VPXCC, pt, sn, ts, and SSRC in gateway 40 memory. Accordingly, the gateway 40 processor may set index values to aid in the correlation search. For example, as shown in block 721, the gateway 40 processor may set a variable, such as "index_RTP_header" equal to zero to indicate the position in gateway 40 memory where the most recent RTP header is located. The variable "index" may be set equal to 12 bytes to indicate where the next RTP header correlation search should start. The size 12 bytes corresponds to length of the RTP header in bytes.

At block 730, the gateway 40 processor may read the fields at the index. The gateway 40 processor may compare the RTP header fields at the index to the most recent RTP packet header fields, as shown in block 740. Comparison includes matching the VPXCC, pt, and SSRC with the most recent stored RTP packet header fields. Comparison also includes ensuring that the sequence number (sn) is equal to 1 greater than the sn in the most recent stored RTP packet header filed. Comparison also includes ensuring that the timestamp (ts) field is greater than or equal to the timestamp field in the most recent stored RTP packet header field. If the index header fields do not match the most recent stored RTP header fields ("No" at block 740), the gateway 40 processor increments the index by 1 byte, as shown at block 741 and checks to see if there is at least 12 bytes available to be searched (780). If there is at least 12 bytes ("Yes" at block 780), the gateway processor 40 repeats reading (730) and comparison (740) until the index header fields match the most recent stored RTP packet header fields ("Yes" at block 740). If there is less than 12 bytes ("No" at block 780), the gateway 40 processor copies the video bytes from the next H.221 frame available (710) to gateway 40 memory and update the number of bytes copied (numBytes) accordingly.

Once an RTP header is detected at block 750, the gateway 40 processor may extract the RTP packet located in gateway 40 memory from the value index_RTP_header to index. Also, the sn and ts RTP header fields are updated (750) to reflect the values of this most recently discovered RTP header. The location of this RTP header is stored (760) using the value index_RTP_header. The index to start searching for the next RTP header is updated (770) by incrementing the index value by the length of the RTP header (12 bytes). The correlation process resumes (730) by reading the fields at the index value and comparing them to the previously stored values of the RTP header (740).

The extracted RTP packet may be transmitted to the endpoint 50. The RTP packet may be transmitted across network 60, which may be an H.323 defined protocol. Since the RTP packet includes the original header and sub-header provided by the originating endpoint 20, the RTP packet may be transmitted to the endpoint 50 without re-packetizing the RTP packet, for example, at the packetization module M5.

The gateway 40 processor may store the RTP packets in memory prior to sending the RTP packets to the endpoint 50. A packet buffer may be used. The packet buffer may be a section of memory used to store information to be placed in the framing sections.

The gateway 40 memory may be a computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The gateway 40 memory may be a single device or a combination of devices. The gateway 40 memory may be adjacent to, part of, networked with and/or remote from the gateway 40 processor.

The gateway 40 memory may be a computer readable storage media having stored therein data representing instructions executable by the programmed gateway 40 processor for visually representing a project in a workspace. The gateway 40 memory stores instructions for the gateway 40 processor. The gateway 40 processor is programmed with and executes the instructions. The functions, acts, methods or tasks illustrated in the figures or described herein are performed by the programmed gateway 40 processor executing the instructions stored in the gateway 40 memory. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The computer readable storage media stores data representing instructions executable by a programmed processor, such as gateway 40 processor, for RTP tunneling through H.221. The instructions may include receiving an RTP packet; setting up a video tunnel with the first communication device; copying the video data into a sub-channel portion of an H.221 frame; and transmitting the H.221 frame to a first communication device on a defined protocol.

In one embodiment, the second gateway 50 may modify the RTP header fields to accommodate negotiated fields between the second gateway 50 and the endpoint 60. For example, based on the connections, networks, or protocols used for transmitting the segmented delivery packet, the second gateway 50 may modify the specific fields to the header, such as a payload type field, SSRC field, or timestamp field.

The second gateway 40 may transmit the RTP packet to the second endpoint 50. The second gateway 40 may transmit the delivery RTP packet according to a defined protocol, such as H.323.

The second endpoint 50 may receive the delivery RTP packet. Upon receipt of the delivery RTP packet, the second endpoint 50 may process, store, or display the delivery RTP packet. For example, the second endpoint 50 may fragment the delivery RTP packet. The second endpoint 50 may strip the headers, and sub-headers from the delivery RTP packet. The payload section, which includes the conference data, may be used for display.

The second endpoint 50 may display video based on the conference data in the payload frame of the packet. In the example above, employee Y is able to view the video transmitted by employee X.

The back and forth transmission of video data, between the first and second endpoints 20, 50 may be used for a video conference between the users of the endpoints 20, 50. In the example from above, employee X may use the first endpoint 20 to have a near real time video conference with employee Y using the second endpoint 50.

Figure 5:
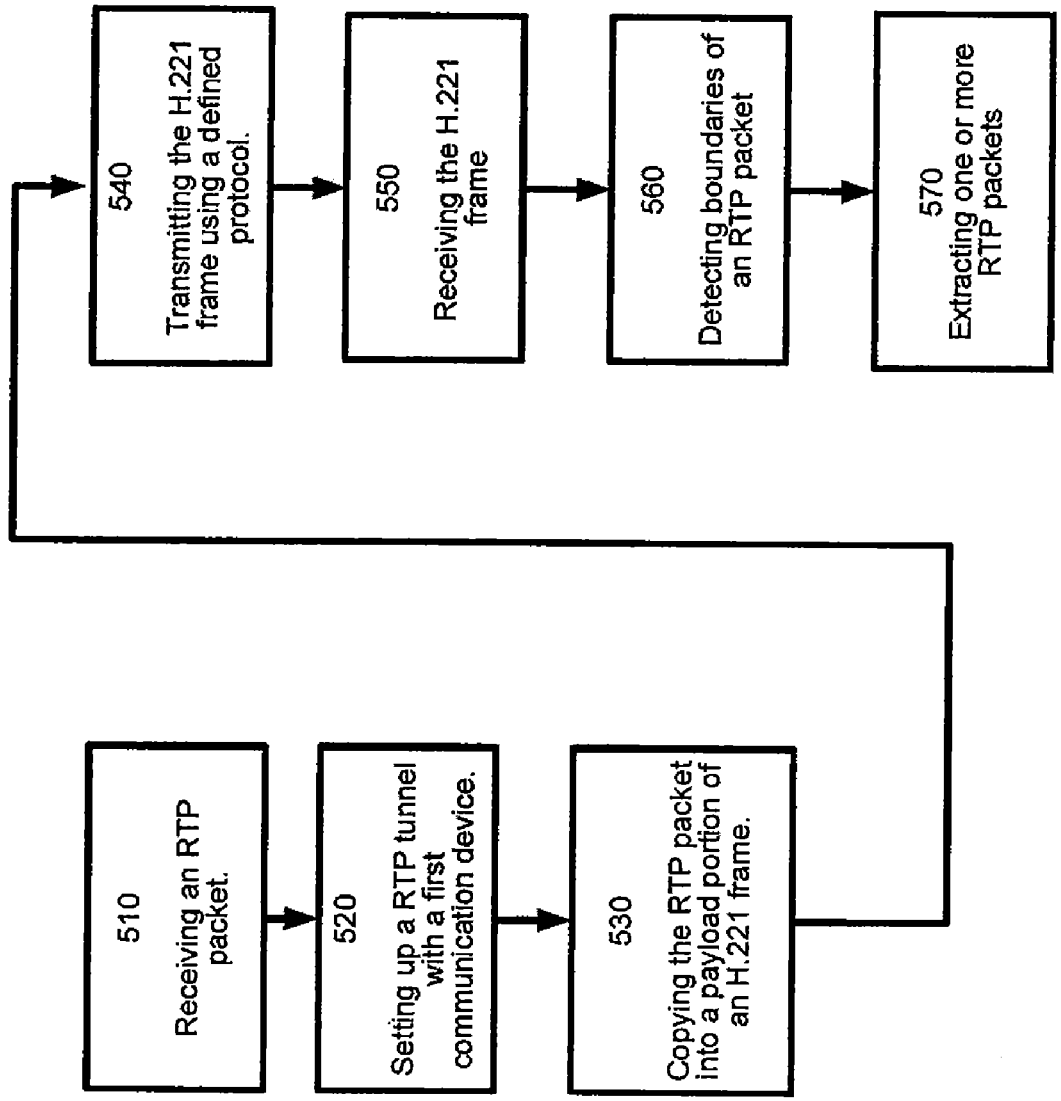
FIG. 5 illustrates one embodiment of a flow chart for video conferencing.

FIG. 5 shows a method for video transmission. The method may include receiving an RTP packet (act 510); setting up a video tunnel with the first communication device (act 520); copying the video data into a video portion of an H.221 frame (act 530); and transmitting the H.221 frame to a first communication device on a defined protocol (act 540). Additional, different, or fewer acts than shown in FIG. 5 may be provided. For example, act 520 need not be performed. The acts may be performed in the order shown or a different order. For example, act 520 may be performed before act 510. The acts may be performed automatically, manually, or the combination thereof. The acts may be performed by one, some, or all of the components in the system 10 of FIG. 1 or a different system In act 510, a first gateway may receive a packet. The packet may be received using a defined protocol, such as the Real Time Protocol. Accordingly, the packet may be an RTP packet. The RTP packet may be transmitted across an H.323 network from a first communication device. The RTP packet may include header, sub-header, and conference data.

In act 520, the first gateway sets up RTP tunneling with a second gateway. Setting up a video tunnel may include determining whether RTP video tunneling is supported and the direction of RTP tunneling. Additional, different, or fewer acts may be provided. A first gateway receives one or more messages from a second gateway. The one or more messages may include data that indicates whether the second gateway supports RTP video tunneling through an H.221 frame and/or the MTU size of the second gateway. For example, a message may indicate whether the second gateway is operable to receive an RTP packet in the sub-channel portion of an H.221 frame and determine the boundaries of the RTP packet. In another example, a message may indicate whether the second gateway is operable to copy and transmit an RTP packet in the sub-channel portion of an H.221 frame. The one or more messages may be BAS messages.

The first gateway determines whether the second gateway is operable to transmit an RTP packet in the sub-channel portion of an H.221 frame. If the second gateway is operable to transmit RTP tunneling signals, the first gateway may compare the MTU size of the first gateway to the MTU size of the second gateway. If the MTU size of the first gateway is greater than or equal to the MTU size of the second gateway, then the first gateway may be configured such that a header correlation search module is used to extract an RTP packet received in an H.221 frame from the second gateway.

The first gateway determines whether the second gateway is operable to receive and extract an RTP packet in the sub-channel portion of an H.221 frame. If the second gateway is operable to receive RTP tunneling signals, the first gateway compares the MTU size of the first gateway to the MTU size of the second gateway. If the MTU size of the first gateway is less than or equal to the MTU size of the second gateway, then the first gateway may be configured such that the first gateway does not de-packetize the RTP packet received in act 510. Instead, the RTP packet is transmitted to a framer for video tunneling.

In act 530, the RTP packet is copied into a video portion of an H.221 frame or any ISDN-specific frame. Copying the received packet into a video portion may include buffering the packet and aligning the received packet in an H.221 frame. Additional, different, or fewer acts may be provided.

Buffering may include storing the received packet in memory. Buffering may be used for holding the packet for use at a later time, allowing timing corrections to be made on the conference traffic, collecting other packets, delaying the transit time of the packet in order to allow other operations to occur. For example, the packet may be buffered until other packets are received. Once received, the packets may be grouped together for transmission.

In act 540, the frame, including the entire received RTP packet in the sub-channel portion, is transmitted to a first communication device. The H.221 frame may be received by the second gateway (act 550).

In act 560, the boundaries of the RTP packet are detected. Detecting the boundaries may include using a header correlation search. The header correlation search may be used to search for the beginning and ends of the RTP packet. As discussed above, the flow chart in FIG. 7 describes one procedure used to perform the header correlation search. Other methods and procedures may be used to locate the beginning and ends of the RTP packets, including, but not limited to the use of flags or other detectable objects.

In act 570, the packets are extracted at the RTP header boundaries determined in the correlation search. Extraction may include modifying RTP header fields to accommodate negotiated fields. For example, a gateway may modify a payload type field, SSRC field, or timestamp field to accommodate a negotiated field between the gateway and the endpoint.

Various embodiments described herein can be used alone or in combination with one another. The foregoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:
1. A system comprising:

a first gateway operable to receive a real-time protocol (RTP) packet including video data from a first endpoint; and a second gateway operable to communicate with a second endpoint, wherein the first gateway is operable to communicate the RTP packet to the second gateway in a sub-channel portion of a frame-based protocol, wherein the video data of the RTP packet includes header, sub-header, and payload data and the header, sub-header, and payload data of the RTP packet are copied into the sub-channel portion of the frame-based protocol, wherein the second gateway is configured to send a capabilities message to the first gateway and the capabilities message defines whether the RTP packet may be copied into the sub-channel portion of the frame-based protocol, and wherein a tunnel is established between the first gateway and the second gateway based on the capabilities message.

2. The system as claimed in claim 1, wherein the frame-based protocol is an H.221 frame.

3. A system comprising:

a first gateway operable to receive a real-time protocol (RTP) packet including video data from a first endpoint; and a second gateway operable to communicate with a second endpoint, wherein the first gateway is operable to communicate the RTP packet to the second gateway in a sub-channel portion of a frame-based protocol, wherein the video data of the RTP packet includes header, sub-header, and payload data and the header, sub-header, and payload data of the RTP packet are copied into the sub-channel portion of the frame-based protocol, and Bit-rate Allocation Signal (BAS) data is used to determine whether the RTP packet is capable of being copied into the sub-channel portion of the frame-based protocol.

4. The system as claimed in claim 3, wherein the BAS data includes a tunneling capabilities message and MTU size command message.

5. The system as claimed in claim 2, wherein the second gateway is operable to receive the H.221 frame and detect one or more RTP packet headers.

6. The system as claimed in claim 5, wherein the second gateway is operable to transmit the RTP packet to a terminating endpoint without re-packetization of the RTP packet.

7. The system as claimed in claim 1, wherein the first gateway communicates with the second gateway using an H.320 protocol.

8. The system as claimed in claim 1, wherein the first and second gateways are operable to confirm communication of the RTP packet to the second gateway in the sub-channel portion of the frame-based protocol before or during a video conference.

9. A gateway for video data transmission, the gateway comprising:

a memory configured to store a copying program that copies a real time protocol (RTP) packet into a sub-channel portion of a video frame, the RTP packet including a header, a sub-header, and payload data; and a processor coupled to the memory that executes the copying program and generates a capabilities message, wherein the memory includes a transmit program that when executed transmits the video frame with the RTP packet in the sub-channel portion to a second gateway, wherein the capabilities messages provides set up for a video conference tunnel between the gateway and the second gateway.

10. A gateway for video data transmission, the gateway comprising:

a memory configured to store a copying program that copies a real time protocol (RTP) packet into a sub-channel portion of a video frame, the RTP packet including a header, a sub-header, and payload data; and a processor coupled to the memory that executes the copying program, wherein the memory includes a transmit program that when executed transmits the video frame with the RTP packet in the sub-channel portion to a second gateway, wherein the video frame is an H.221 frame.

11. The gateway as claimed in claim 10, wherein the header, sub-header, and payload data are copied into a sub-channel portion of the H.221 frame.

12. The gateway as claimed in claim 9, wherein the memory includes a setup program that determines whether a second gateway supports receiving RTP tunneling signals and compares the maximum transmission unit (MTU) size of the second gateway to the MTU size of the first gateway.

13. The gateway as claimed in claim 9, wherein the memory includes a header correlation search program that when executed searches the sub-channel portion of the video frame and detects one or more headers of the RTP packet.

14. The gateway as claimed in claim 13, wherein the processor extracts the RTP packets from the data transmitted in the sub-channel portion of the video frame and modifies pertinent RTP header parameters according to negotiations with an endpoint.

15. A method for video data transmission, the method comprising:

receiving a video packet including header, sub-header, and video data;

setting up a video tunnel with a first communication device according to a tunneling capabilities message received from the first communication device;

copying the header, sub-header and video data of the video packet into a sub-channel portion of an H.221 frame; and transmitting the H.221 frame to a first communication device using a defined protocol.

16. The method as claimed in claim 15, wherein receiving the video packet includes receiving the video packet from a second communication device using a H.323 protocol, and transmitting includes transmitting the high speed protocol packet to the communication device using a H.320 protocol.

17. The method as claimed in claim 15, wherein setting up the video tunnel includes transmitting the tunneling capabilities message and a MTU size command message from the first communication device to a second communication device.

18. The method as claimed in claim 17, wherein setting up the video tunnel includes confirming that the first communication device is capable of performing a header correlation search process.

* * * * *